(12) United States Patent
Abraham et al.

(10) Patent No.: US 11,565,633 B2
(45) Date of Patent: Jan. 31, 2023

(54) METHOD FOR JOINING A DRIVETRAIN TO A VEHICLE BODY

(71) Applicant: Bayerische Motoren Werke Aktiengesellschaft, Munich (DE)

(72) Inventors: Benjamin Abraham, Munich (DE); Benedikt Fella, Munich (DE); Andreas Schaefer, Schwabhausen (DE); Matthias Stangl, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 383 days.

(21) Appl. No.: 16/791,484

(22) Filed: Feb. 14, 2020

(65) Prior Publication Data

US 2020/0262365 A1 Aug. 20, 2020

(30) Foreign Application Priority Data

Feb. 18, 2019 (DE) ..................... 10 2019 103 953.3

(51) Int. Cl.
*B60R 16/02* (2006.01)
*B60R 16/03* (2006.01)
*B62D 65/00* (2006.01)

(52) U.S. Cl.
CPC .......... *B60R 16/0215* (2013.01); *B60R 16/03* (2013.01); *B62D 65/00* (2013.01)

(58) Field of Classification Search
CPC ..... B60R 16/0215; B60R 16/03; B62D 65/00; B62D 65/10; B62D 65/04; B23P 2700/50; B60G 2204/10; B60N 2/90
See application file for complete search history.

(56) References Cited

U.S. PATENT DOCUMENTS

| 9,434,432 B2* | 9/2016 | Grevener | ............... B62D 65/12 |
| 2003/0037427 A1* | 2/2003 | Chernoff | .................. B60N 2/90 29/428 |
| 2004/0069545 A1 | 4/2004 | Chernoff et al. | |
| 2013/0334839 A1 | 12/2013 | Grevener et al. | |
| 2021/0046978 A1* | 2/2021 | Forostovsky | ........ B60K 7/0007 |

FOREIGN PATENT DOCUMENTS

DE 10 2010 055 942 A1 6/2012
WO WO-0064691 A1 * 11/2000 ............ F16B 5/0241

OTHER PUBLICATIONS

German-language Search Report issued in German Application No. 10 2019 103 953.3 dated Apr. 16, 2010 with partial English translation (10 pages).

* cited by examiner

*Primary Examiner* — Lee A Holly
(74) *Attorney, Agent, or Firm* — Crowell & Moring LLP

(57) ABSTRACT

A method for joining a drivetrain to a vehicle body, includes the steps of: transferring the drivetrain and the vehicle body into a joining position, arranging an electrical connecting element on a chassis part of the drivetrain, and joining the drivetrain to the vehicle body, wherein the drivetrain and the vehicle body are connected together at predetermined points via fasteners.

19 Claims, 2 Drawing Sheets

METHOD FOR JOINING A DRIVETRAIN TO A VEHICLE BODY

CROSS REFERENCE TO RELATED APPLICATION

This application claims priority under 35 U.S.C. § 119 from German Patent Application No. 10 2019 103 953.3, filed Feb. 18, 2019, the entire disclosure of which is herein expressly incorporated by reference.

BACKGROUND AND SUMMARY OF THE INVENTION

The present invention relates to a method for joining a drivetrain to a vehicle body.

In the assembly of vehicles, in particular of passenger cars, it is established practice to produce subassemblies that are then joined together to form a further assembly. Such a subassembly is formed for example by the drivetrain, which may comprise a motor, in particular a combustion engine or electric motor, a transmission, driveshafts, chassis parts, brake system, exhaust system, etc. A further subassembly is formed by the vehicle body, which may comprise the bodywork with flaps arranged thereon, such as doors, hood, lids, etc., interior equipment such as interior trim, seats, dashboard, etc. The joining together of these two subassemblies is a central point in vehicle assembly and is generally also referred to as "marriage". This assembly step is extremely complex, since a large number of fastening points of the drivetrain have to be connected to the vehicle body or vehicle bodywork.

In contemporary vehicle construction, a change is taking place from vehicles that are driven by combustion engines to vehicles that have an electric drive. Both in purely electric vehicles and in what are known as plug-in hybrid vehicles, an external charging capability for charging the onboard accumulator for electric energy has to be provided. These are usually in the form of a charging socket or charging plug and bring about increased assembly complexity in the "marriage". In the prior art, attempts were made to mount the charging socket either before or after the marriage assembly step and to connect it to the bodywork. In the assembly variant after the marriage, manual assembly of the charging socket is able to be performed by a fitter only with great difficulty on account of the unergonomic positioning of the charging socket in a poorly accessible region of the bodywork. Alternatively, during assembly of the charging socket on the bodywork before the marriage, it is necessary for the charging line that leads from the charging socket to the energy accumulator to be protected during the marriage from damage that may arise for example through clamping of the charging line.

Proceeding from this prior art, the object of the present invention is to provide a method with which the drawbacks of the prior art are overcome. A particular object of the invention is to provide a method for assembling vehicle bodyworks on a drivetrain, which is distinguished by a high degree of rationalization.

The invention proposes a method for joining a drivetrain to a vehicle body, having the steps of:

transferring the drivetrain and the vehicle body into a joining position, and joining the drivetrain to the vehicle body, wherein the drivetrain and the vehicle body are connected together at predetermined points via fasteners. In this case, an electrical connecting element can be arranged on a chassis part of the drivetrain. Within the meaning of this invention, fasteners are for example screws, rivets, clips or other joining devices, which are suitable for detachably connecting the individual components of the drivetrain to the bodywork or to the vehicle body. Suitable electrical connecting elements are in particular charging sockets, which are installed on the vehicle and are connected to an onboard electrical energy accumulator. Into this charging socket, it is possible to plug a charging plug, which is connected, outside the vehicle, to a charging station, for example, in order to charge the vehicle with electrical energy. Of course, it is also possible for the charging plug to be onboard the vehicle and the charging socket outside the vehicle. If an onboard plug is used as electrical connecting element, it is of course also necessary to provide personal protection in order to avoid a situation in which people can suffer electric shocks.

In the above-described joining position, the drivetrain and the vehicle body are oriented with respect to one another such that fasteners can be fitted particularly easily. For example, drilled holes for receiving screws in the drivetrain are aligned with drilled holes for receiving the same screws in the vehicle body. The arranging of an electrical connecting element on a chassis part affords the advantage that the charging socket is fixed to a chassis part during the marriage, thereby mitigating the installation-space situation. Furthermore, the ergonomics for fitting personnel is considerably improved.

Furthermore, the arranging of the electrical connecting element can take place before the drivetrain is joined to the vehicle body.

Additionally or alternatively, the electrical connecting element can be arranged in a detachable manner on the chassis part. The arranging of the electrical connecting element on a chassis component affords the advantage that, after the joining, the electrical connecting element is already in a region of the vehicle body that corresponds virtually to the end position of the electrical connecting element in the vehicle body. Thus, only slight repositioning of the electrical connecting element is necessary in order to bring it into the desired end position and to connect it to the vehicle body or vehicle bodywork.

Chassis parts within the meaning of this invention can be dampers, spring elements, spring-damper struts, longitudinal links, transverse links or subframe. Furthermore, after or during the joining of the drivetrain to the vehicle body, the electrical connecting element can be detached from the chassis part and be connected to the vehicle body in a fixed manner.

In an alternative embodiment, after the joining of the drivetrain to the vehicle body, the electrical connecting element can remain on the chassis part and be connected to the vehicle body in a fixed manner. This affords the advantage that, after the marriage joining step, the electrical connecting element is already automatically arranged in the end position, such that all that is necessary is for a connection to the bodywork to be produced, for example by screwing. The step of repositioning the connecting element can thus be eliminated.

Additionally or alternatively, a holder can be provided on the chassis part, wherein during the arranging of the electrical connecting element, the connecting element is arranged on the holder and is thus arranged indirectly on the chassis component. Through the use of a separate holder, standard chassis parts can be used, on which a vehicle-specific holder is arranged. Therefore, a specific chassis part does not have to be designed separately for each vehicle derivative.

In a method variant, the holder is not connected to the chassis component in a detachable manner. Therefore, after the assembly process, the holder remains on the vehicle. An additional removal step is thus eliminated.

Alternatively, the holder can be connected to the chassis part in a detachable manner and be removed from the chassis part in a removal step after the joining of the drivetrain to the vehicle body. This method alternative affords the advantage that the holder can be recycled for subsequent assembly processes and at the same time the vehicle weight is reduced by the weight of the holder.

Other objects, advantages and novel features of the present invention will become apparent from the following detailed description of one or more preferred embodiments when considered in conjunction with the accompanying drawings.

DETAILED DESCRIPTION OF THE DRAWINGS

The method according to the invention will be explained with reference to FIGS. 1 and 2.

Figure 1:
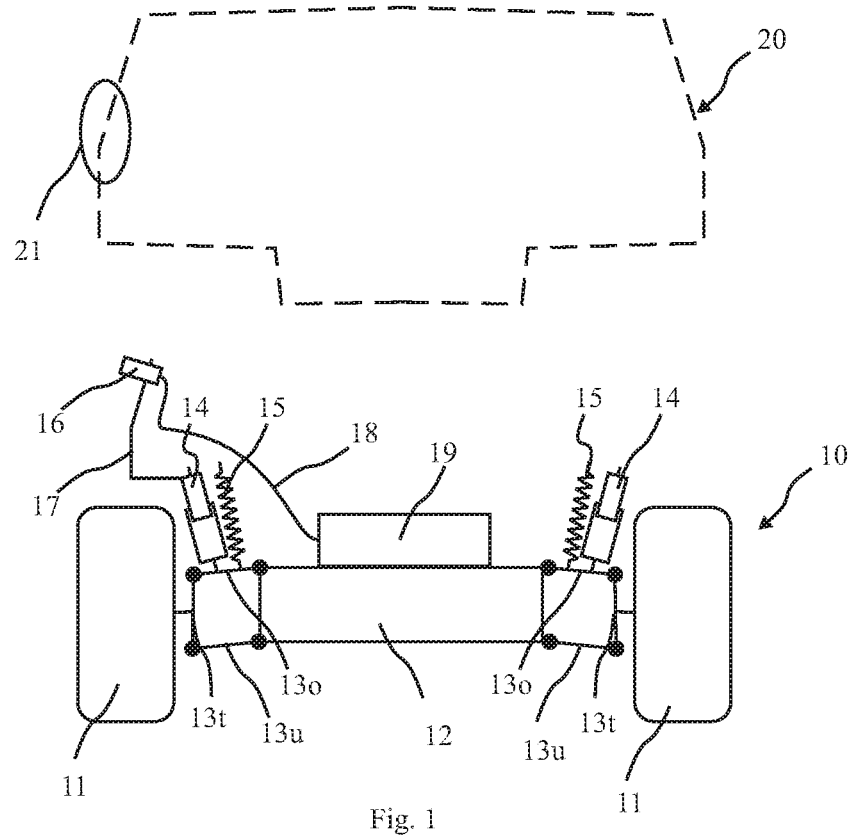
FIG. 1 shows a method step immediately before the joining step.

FIG. 1 shows a drivetrain 10 as a first subassembly. The drivetrain 10 comprises in this case for example the rear axle of a vehicle. A centrally located subframe 12 is connected via joints to a lower transverse link 13U and an upper transverse link 13O, respectively. These transverse links are connected to a wheel carrier 13T. The wheel carrier 13T is connected to a wheel 11 via an axle. The wheels 11 illustrated in FIGS. 1 and 2 are not necessarily part of the drivetrain. Usually, during the marriage method step, the drivetrain is connected to the bodywork without the wheels 11. The illustration of the wheels 11 serves here only to make it easier to understand the view.

Provided on each upper transverse link 13O are a damper 14 and a spring element 15. These elements serve to cushion or damp the wheel guiding elements, i.e. the chassis parts, with respect to the bodywork in a controlled manner during compression movements of the wheels.

The drivetrain 10 furthermore comprises an electrical energy accumulator 19. The latter is connected to a charging socket 16 via an electrical line 18. In order that this charging socket is oriented in a predetermined position, it is connected to the damper 14 via a holder 17. The arrangement of the holder 17 is only arranged by way of example on an upper end of the damper 14, i.e. an end facing the vehicle bodywork 20. Of course, the holder can also be arranged on other chassis parts, for example on the upper end of the spring element 15. Illustrated figuratively above the drivetrain 10 in FIG. 1 is a vehicle body 20. The vehicle body 20 therefore corresponds to a bodywork, which is placed on the drivetrain 10. The vehicle body 20 has a predetermined portion 21 in which an aperture is provided, for example similar to a fuel filler flap. In this aperture and thus in this predetermined region, the electrical connecting element 16 is intended to be arranged after joining.

Figure 2:
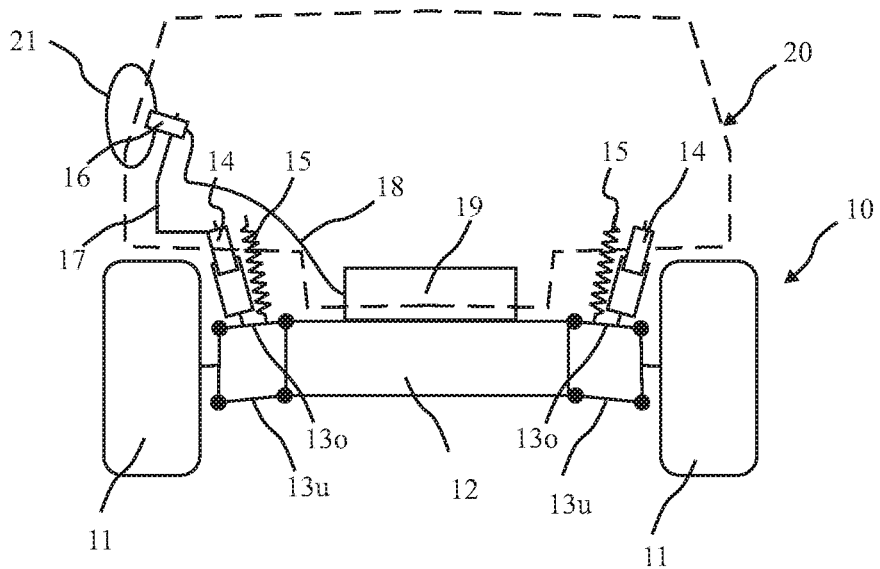
FIG. 2 shows a method state immediately after the joining step.

FIG. 2 shows the state immediately after the joining step. The vehicle body 20 is now connected to the drivetrain 10. Usually, for this purpose, the subframe 12 is screwed to the vehicle body 20 via a plurality of screws. Similarly, those ends of the dampers 14 and of the springs 15 that face the vehicle body 20 are screwed to the vehicle body 20. As illustrated in FIG. 2, the electrical connecting element 16 is located in the predetermined region 21. Via an opening in the bodyshell of the vehicle bodywork 20, a worker can now grip the charging socket 16 and pull it up to the bodywork, such that it is connected to the bodywork for example via screws. Alternatively, the worker can also grip the charging socket 20 through the wheel arch and push it against the bodywork bodyshell. As a result of the charging socket being arranged on the holder, the charging socket is fixed during joining. The holder 17 advantageously takes up only little space. This is particularly important since the charging socket 16 is usually located in a critical installation space between the bodyshell and the chassis components of the axle, in particular of the damper. The package problem is additionally intensified by the fact that there is a retraction in the outer shaping in the rear region of a vehicle. This narrowing of the vehicle bodywork toward the rear thereof is aerodynamically necessary.

Figure 3:
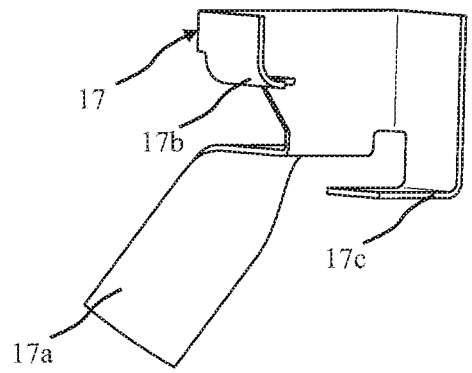
FIG. 3 shows a perspective view of a holder.
Figure 4:
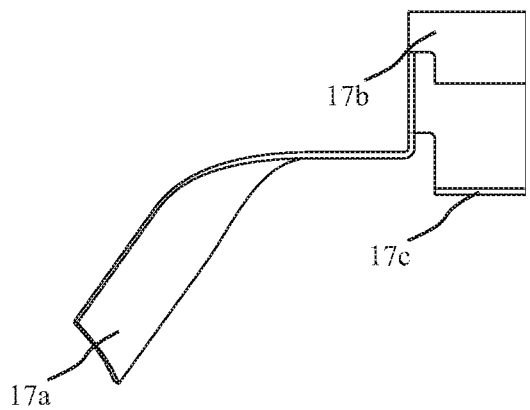
FIG. 4 shows a side view of a holder.
Figure 5:
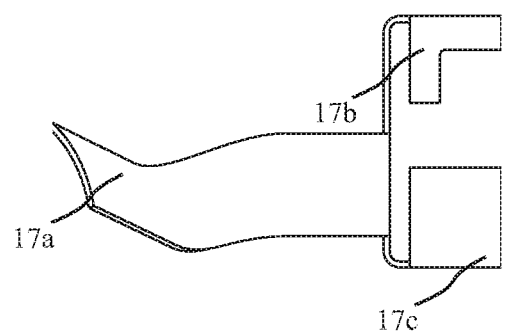
FIG. 5 shows a further side view of a holder.

With reference to FIGS. 3, 4 and 5, the structure of the holder 17 will now be explained. The holder 17 has a first, extensive lug 17a. With this lug 17a, the holder 17 can be attached to a damper 14. Preferably, the lug 17a is adhesively bonded with its surface to an end portion of a damper 14.

In an upper region, the holder 17 has holding clips 17b and 17c. These holding clips 17b, 17c are configured in the form of hooks and serve to receive the charging socket 16. Before the joining step, the charging socket 16 is placed in the region of the holder 17 such that the charging socket 16 is held in the upper portion of the holder 17. The hooks 17b and 17c thus form a retaining force, which opposes the weight force that acts on the charging socket 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for joining a drivetrain to a vehicle body, comprising:
  transferring the drivetrain and the vehicle body into a joining position;
  arranging an electrical connecting element on a chassis part of the drivetrain, the electrical connecting element including a charge socket;
  joining the drivetrain to the vehicle body, wherein the drivetrain and the vehicle body are connected together at predetermined points via fasteners.
2. The method according to claim 1, wherein
  the electrical connecting element is arranged in a detachable manner on the chassis part.
3. The method according to claim 2, wherein,
  after or during the joining of the drivetrain to the vehicle body, the electrical connecting element is detached from the chassis part and is connected to the vehicle body in a fixed manner.

4. The method according to claim 2, wherein,
after the joining of the drivetrain to the vehicle body, the electrical connecting element remains on the chassis part and is connected to the vehicle body in a fixed manner.

5. The method according to claim 1, wherein
a holder is provided on the chassis part and the electrical connecting element is connected indirectly to the chassis part via use of the holder.

6. The method according to claim 5, wherein
the holder is connected to the chassis part in a nondetachable manner.

7. The method according to claim 5, wherein
the holder is connected to the chassis part in a detachable manner and is removed from the chassis part after the joining of the drivetrain to the vehicle body.

8. The method according to claim 1, wherein
the arranging of the electrical connecting element takes place before the drivetrain is joined to the vehicle body.

9. A method for joining a drivetrain to a vehicle body, comprising:
transferring the drivetrain and the vehicle body into a joining position;
arranging an electrical connecting element on a chassis part of the drivetrain;
joining the drivetrain to the vehicle body, wherein the drivetrain and the vehicle body are connected together at predetermined points via fasteners, wherein
after or during the joining of the drivetrain to the vehicle body, the electrical connecting element is detached from the chassis part and is connected to the vehicle body in a fixed manner.

10. The method according to claim 9, wherein
a holder is provided on the chassis part and the electrical connecting element is connected indirectly to the chassis part via use of the holder.

11. The method according to claim 10, wherein
the holder is connected to the chassis part in a nondetachable manner.

12. The method according to claim 10, wherein
the holder is connected to the chassis part in a detachable manner and is removed from the chassis part after the joining of the drivetrain to the vehicle body.

13. The method according to claim 9, wherein
the electrical connecting element is arranged in a detachable manner on the chassis part.

14. The method according to claim 13, wherein,
after the joining of the drivetrain to the vehicle body, the electrical connecting element remains on the chassis part and is connected to the vehicle body in a fixed manner.

15. The method according to claim 9, wherein
the arranging of the electrical connecting element takes place before the drivetrain is joined to the vehicle body.

16. A method for joining a drivetrain to a vehicle body, comprising:
transferring the drivetrain and the vehicle body into a joining position;
arranging an electrical connecting element on a chassis part of the drivetrain;
joining the drivetrain to the vehicle body, wherein the drivetrain and the vehicle body are connected together at predetermined points via fasteners, wherein
a holder is provided on the chassis part and the electrical connecting element is connected indirectly to the chassis part via use of the holder, and wherein
the holder is connected to the chassis part in a nondetachable manner.

17. The method according to claim 16, wherein
the arranging of the electrical connecting element takes place before the drivetrain is joined to the vehicle body.

18. The method according to claim 16, wherein
the electrical connecting element is arranged in a detachable manner on the chassis part.

19. The method according to claim 16, wherein,
after the joining of the drivetrain to the vehicle body, the electrical connecting element remains on the chassis part and is connected to the vehicle body in a fixed manner.

* * * * *